(12) United States Patent
Lin

(10) Patent No.: US 8,566,975 B1
(45) Date of Patent: Oct. 29, 2013

(54) FAUCET CONTROL STRUCTURE

(75) Inventor: Wen-Tsung Lin, Fangyuan Township, Changhua County (TW)

(73) Assignee: Hsue Sam Enterprise Co., Ltd., Changhua County (TW)

( * ) Notice: Subject to any disclaimer, the term of this patent is extended or adjusted under 35 U.S.C. 154(b) by 0 days.

(21) Appl. No.: 13/470,222

(22) Filed: May 11, 2012

(51) Int. Cl.
*F16K 51/00* (2006.01)
(52) U.S. Cl.
USPC ................ 4/678; 137/801; 239/505; 251/320
(58) Field of Classification Search
USPC ............... 4/678; 137/801; 251/319–321, 326; 239/505, 587.1
See application file for complete search history.

(56) References Cited

U.S. PATENT DOCUMENTS

| | | | | |
|---|---|---|---|---|
| 3,387,816 A * | 6/1968 | Holycross | ..................... | 137/801 |
| 3,419,914 A * | 1/1969 | Moen | ................. | 4/678 |
| 6,070,280 A * | 6/2000 | Ko | .................... | 4/678 |
| 6,449,784 B1 * | 9/2002 | Pelletz | .......... | 137/801 |
| 6,925,662 B1 * | 8/2005 | Tan et al. | ........... | 4/678 |
| 7,258,322 B1 * | 8/2007 | Yang | .............. | 137/801 |
| 2006/0042006 A1 * | 3/2006 | Thomas | ............. | 4/678 |

* cited by examiner

*Primary Examiner* — John Bastianelli

(57) ABSTRACT

A faucet control structure includes an outlet head, a switch rod and a valve body. The outlet head is provided therein with a through-hole, a downward outlet end and an inlet chamber. The outlet end and the inlet chamber are separated by the through-hole. One end of the switch rod is enlarged to form a pulling head, and the other end is provided with a restricting groove. The valve body has a partitioning plate whose front surface is provided with two clamping claws. An inverted U-shaped flexible piece is integrally formed atop the valve body. Both sides of the flexible piece are provided with a bending section respectively. The bending sections provide a force for supporting the valve body when the valve body is compressed by an external force, and provide a restoring force to the valve body after the external force is removed.

3 Claims, 5 Drawing Sheets

FAUCET CONTROL STRUCTURE

BACKGROUND OF THE INVENTION

1. Field of the Invention

The present invention relates to a faucet control structure, and in particular to a faucet control structure, whereby water can continuously flow out of its outlet port in a normal state.

2. Description of Prior Art

As for a faucet provided in a bathroom, a user may operate the faucet in two ways. One way is to mount the faucet above a bathtub for draining water into the bathtub, so that the user can take a bath in the bathtub. The other way is to mount an connecting water pipe between the faucet and a shower nozzle located above the faucet, so that the water coming from the faucet can flow through the connecting water pipe to spray out of the shower nozzle. In this way, the user can take a shower. In order to combine these two ways into one faucet, a switch valve has to be mounted on the faucet. The user pulls or pushes the switch valve to switch the water flow of the faucet to the bathtub or the shower nozzle. More specifically, when the user wants to take a bath, he/she turns on the faucet, and the water flows directly out of a front end (i.e. the outlet port) of the faucet into a container (e.g. the bathtub) under the faucet. When the user wants to take a shower, he/she pulls upwardly the switch valve, so that the switch valve blocks the water from flowing though the outlet port of the faucet and guides the water to flow through the connecting water pipe to spray out of the shower nozzle. The upwardly-pulled switch valve is supported by the water pressure in the faucet, so that the switch valve will not fall downwardly unless the user turns off the faucet. When the user turns off the faucet, the water pressure in the faucet is reduced to such an extent that it is smaller than the weight of the switch valve. At this time, the switch valve will fall downwardly due to its weight.

However, in practice, the conventional faucet has the following problems:

(I) If the pressure of water remained in the faucet is too high, the switch valve cannot fall downwardly due to its weight even though the faucet is turned off. As a result, when the user turns on the faucet next time, the water may suddenly spray out of the shower nozzle.

(II) When the water suddenly sprays out of the shower nozzle, the user often gets shocked. Unfortunately, if hot water suddenly sprays out of the shower nozzle, the user may be scaled by the hot water, which is a big problem in safety.

(III) When the faucet is turned off and the pressure of water remained in the faucet is too high, the switch valve cannot fall downwardly by its weight. At this time, the user has to exert a force larger than the pressure of the remaining water so as to press the switch valve downwardly, which is inconvenient in use.

In view of the above, the present inventor proposes a novel structure based on his expert experience and delicate researches.

SUMMARY OF THE INVENTION

The present invention provides a faucet control structure, in which a flexible piece is provided to push a switch rod and a valve body. Thus, the invention has the advantageous features in comparison with prior art.

(I) When the faucet is turned off, the switch rod and the valve body can fall downwardly due to their weight together with the restoring force of the flexible piece. By this arrangement, the pressure of water remained in the faucet or the connecting water pipe is not too high, and thus the water will not suddenly spray out of a shower nozzle when the faucet is turned on next time.

(II) According to the faucet control structure of the invention, the water can flow out of an outlet port of the faucet in a normal state. Thus, the water will not suddenly sprays out of the shower nozzle when the faucet is turned on next time, thereby preventing the user from getting shocked by the sudden spraying of water or getting scaled by the spraying of hot water. Therefore, the invention has an improved safety in use.

(III) According to the faucet control structure of the invention, the water can flow out of an outlet port of the faucet in a normal state. Thus, the user needs not to exert a force to push back the switch rod, which is convenient in use.

(IV) According to the faucet control structure of the invention, the flexible piece and bending sections are integrally formed atop the valve body, which reduces the production cost and simplifies the assembling process thereof. Thus, the invention is more competitive in this industry.

DETAILED DESCRIPTION OF THE PREFERRED EMBODIMENT

Figure 1:
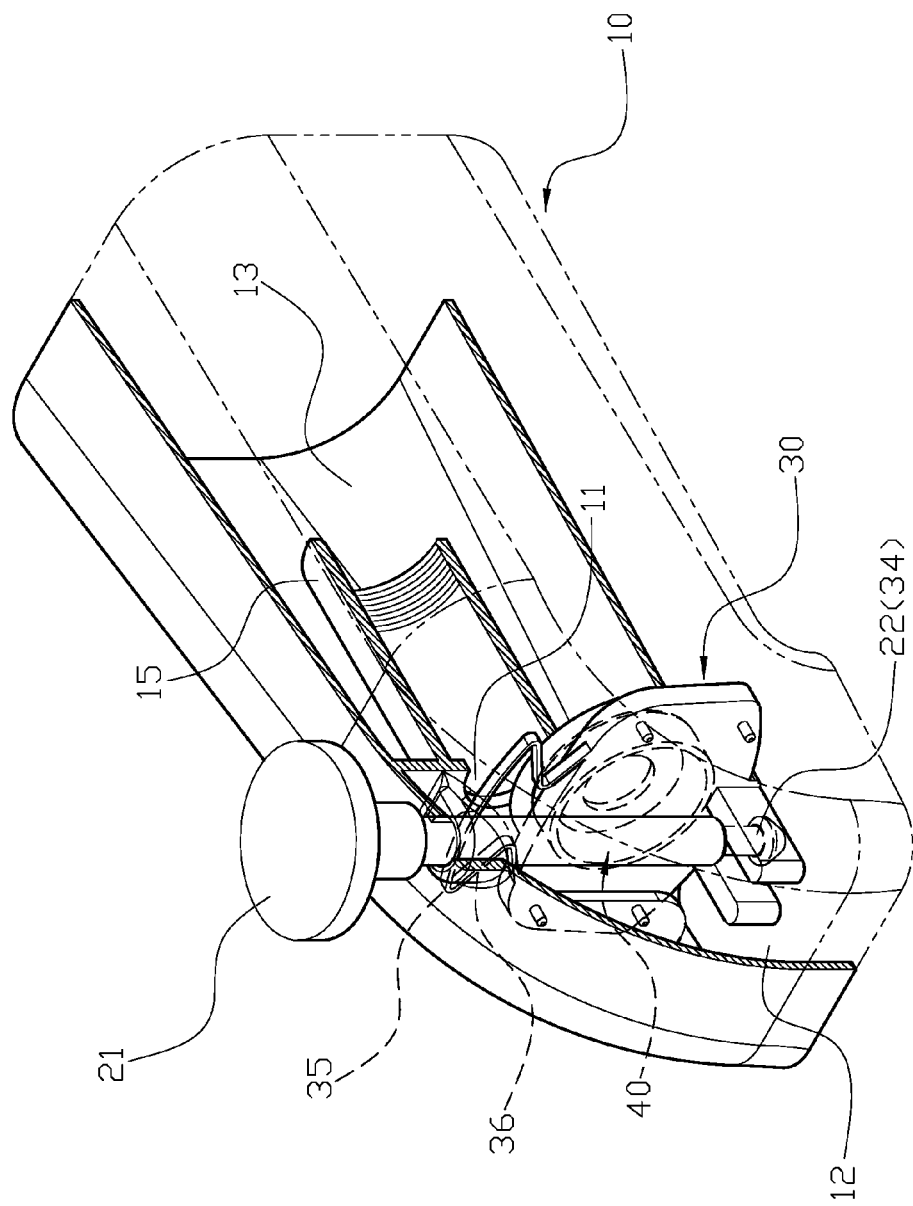
FIG. 1 is an assembled perspective view of a preferred embodiment of the invention.
Figure 2:
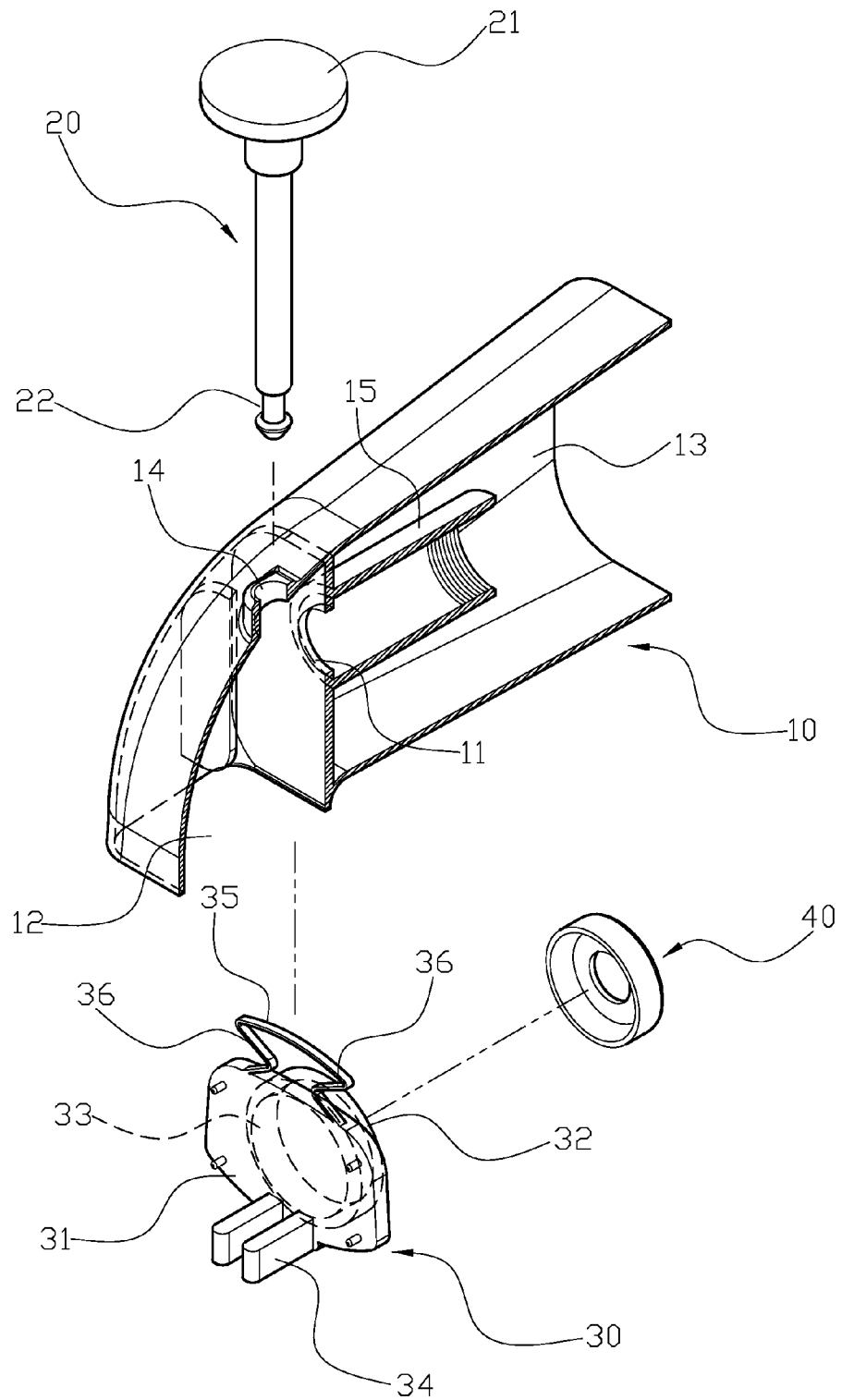
FIG. 2 is an exploded perspective view of the preferred embodiment of the invention.
Figure 3:
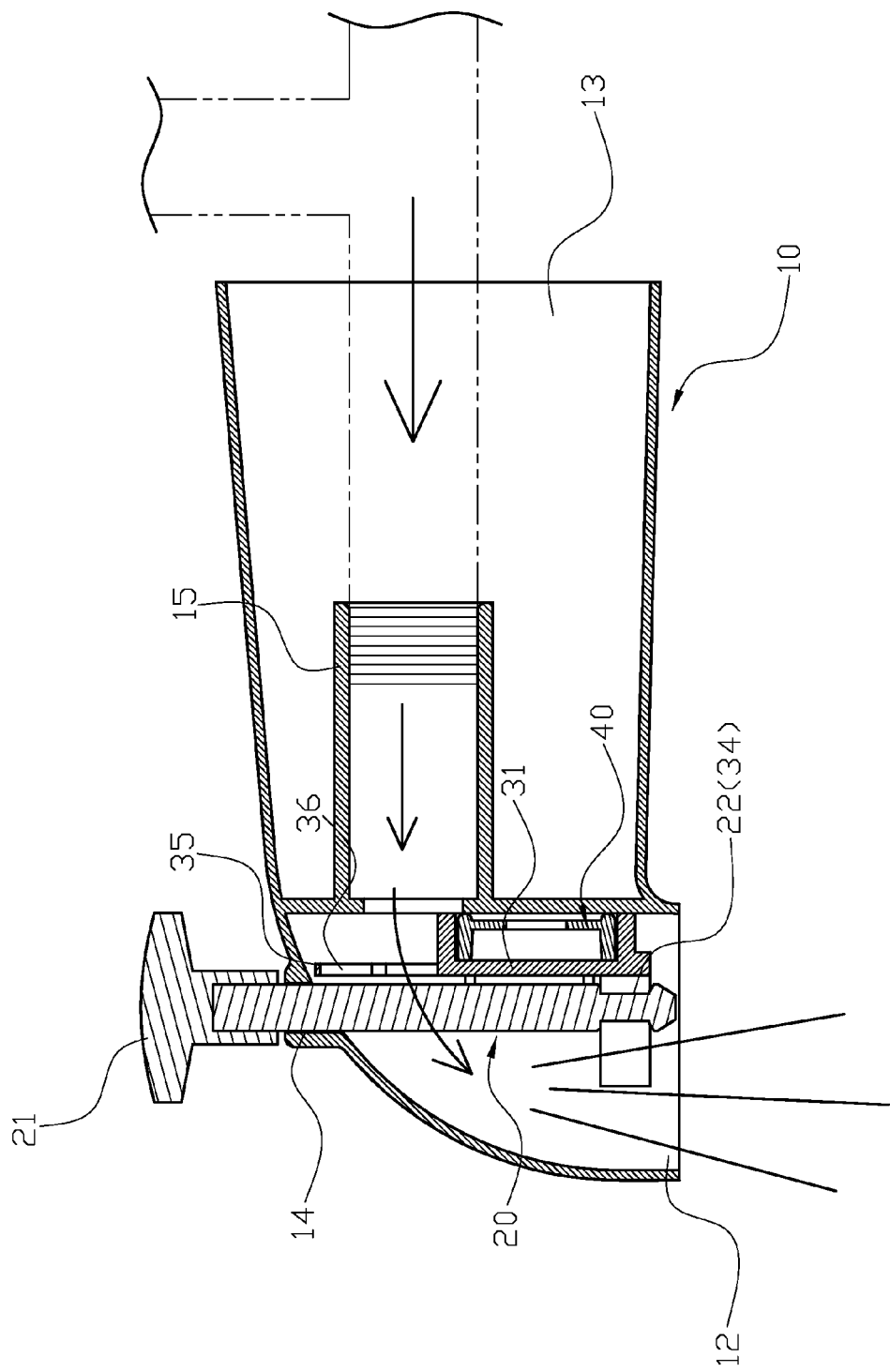
FIG. 3 is a cross-sectional view showing that water flows downwardly out of an outlet port of the faucet according to the embodiment of the invention.

Please refer to FIGS. 1 to 3. A preferred embodiment of the present invention provides a faucet control structure, which includes an outlet head 10, a switch rod 20 and a valve body 30. The interior of the outlet head 10 is provided with a through-hole 11. The interior of the outlet head 10 is further provided with an outlet end 12 facing downwardly and an inlet chamber 13. The outlet end 12 and the inlet chamber 13 are separated from each other by the through-hole 11. At the top of the outlet head 10, a switch rod hole 14 is provided above the outlet end 12. The interior of the inlet chamber 13 is provided around the through-hole 11 with a connecting pipe 15 extending rearward in the axial direction of the through-hole 11. One end of the switch rod 20 is enlarged to form a pulling head 21, and the other end is provided with a restricting groove 22. The end of the switch rod 20 having the restricting groove 22 penetrates into the switch rod hole 14 via the outside of the outlet head 10, so that the switch rod 20 can be combined with the valve body 30 in the outlet head 10. The valve body 30 has a partitioning plate 31. The rear surface of the partitioning plate 31 is provided with a protrusion 32 having a chamber 33. A leak-proof gasket 40 is disposed in the chamber 33. The front surface of the partitioning plate 31 is provided with two clamping claws 34 for clamping the restricting groove 22 after the valve body 30 is disposed in outlet head 10 via the outlet port 12. In this way, the valve body 30 can be mounted into the outlet head 10 and driven by the switch rod 20. An inverted U-shaped flexible piece 35 is integrally formed atop the valve body 30. Both sides of the flexible piece 35 are provided with a bending section 36 respectively. The bending sections 36 not only provide a force for supporting the valve body 30 when the valve body 30 is compressed by an external force, but also provide a restoring force to the valve body 30 after the external force is removed.

Figure 4:
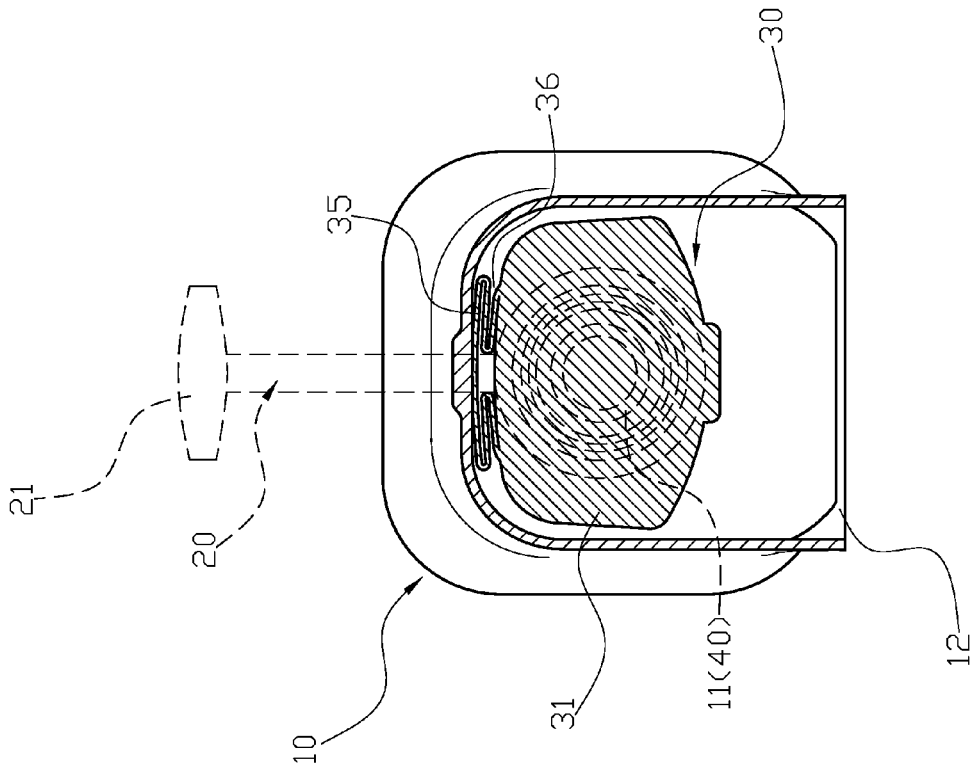
FIG. 4 is another cross-sectional view showing that water flows downwardly out of an outlet port of the faucet according to the embodiment of the invention.
Figure 6:
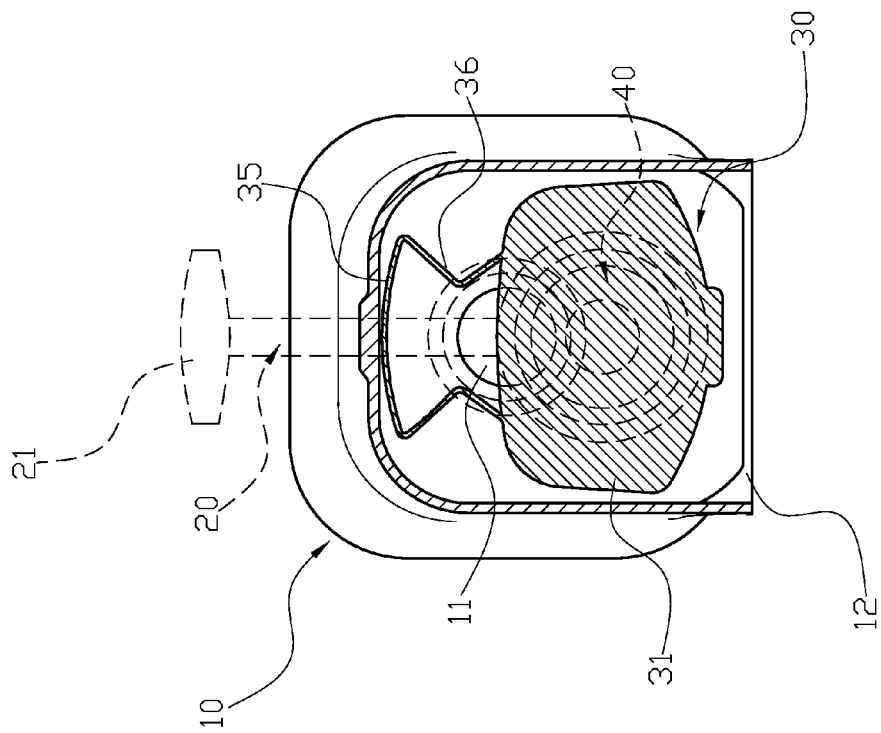
FIG. 6 is another cross-sectional view showing that water flows upwardly out of a shower nozzle according to the embodiment of the invention.
Figure 5:
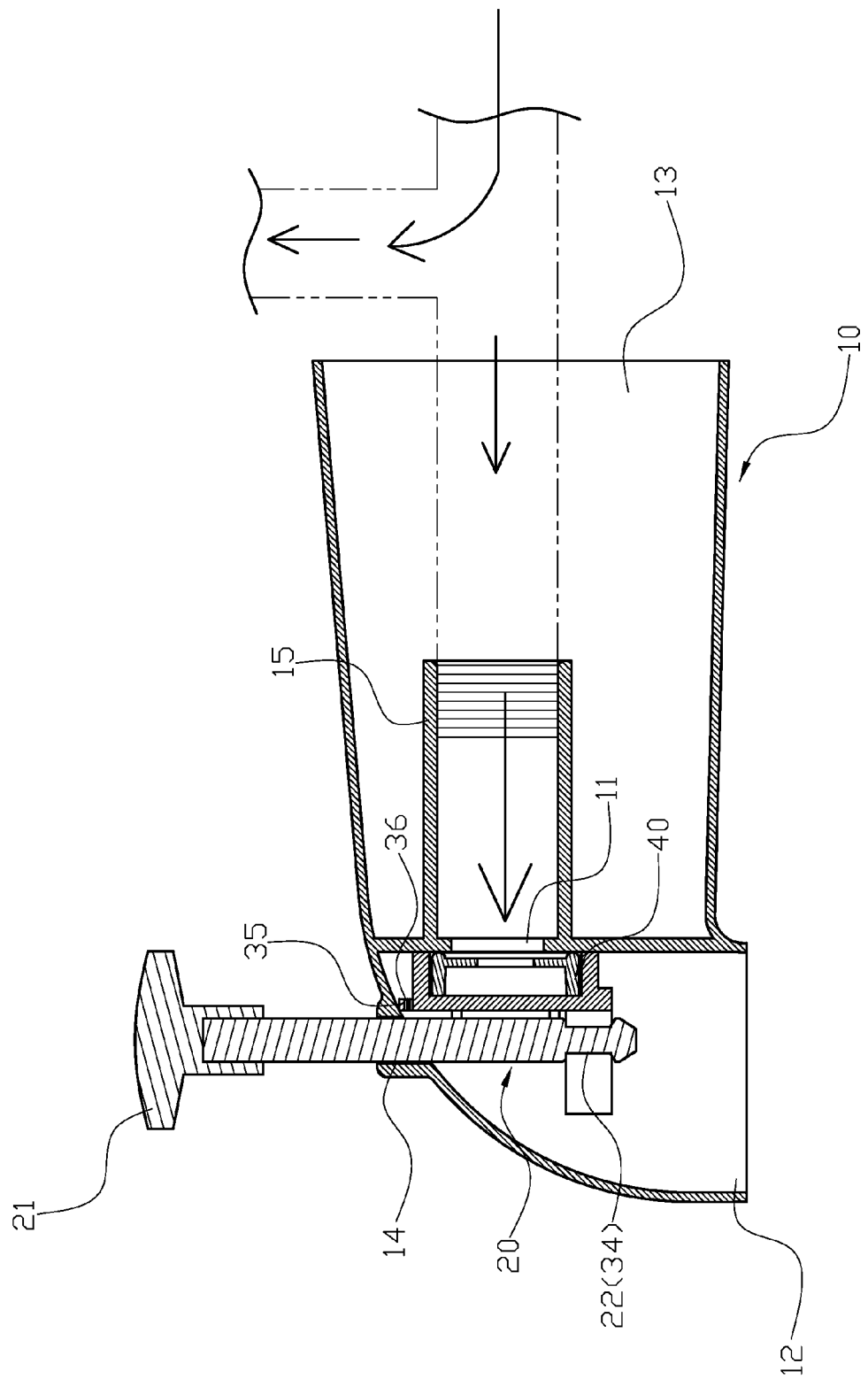
FIG. 5 is a cross-sectional view showing that water flows upwardly out of a shower nozzle according to the embodiment of the invention.

In practice, if the user does not pull or push the pulling head 21, as shown in FIGS. 3 and 4, the water flows through the connecting pipe 15 and the through-hole 11, and then flows downwardly out of the outlet port 12 directly to be accommodated in a container or bathtub underneath the outlet port 12. When the user pushes upwardly on the pulling head 21, as shown in FIGS. 5 and 6, the switch rod 20 drives the valve body 30 to move upwardly, so that the partitioning plate 31, the chamber 33 and the leak-proof gasket 40 together seal the through-hole 11. As a result, the water is filled into the connecting pipe 15, so that the water pressure continuously increases to support the valve block 30 from falling downwardly. At this time, the water cannot but flow flow back into an upward-oriented water pipe (indicated by dotted lines in FIG. 5) to reach a shower nozzle (not shown) located above the faucet, so that the user can take a shower. On the other hand, when the valve body 30 is pulled upwardly, the flexible piece 35 firstly abuts against the inner wall of the outlet head 10. When the valve body 30 gradually moves upwardly, the flexible piece 35 is gradually compressed. After the faucet is turned off completely, the water pressure in the connecting pipe 15 decreases, so that the switch rod 20 and the valve body 30 will automatically fall downwardly due to their weight together with the restoring force of the flexible piece 35. In this way, the through-hole 11 can be opened again, so that faucet returns to its normal state to allow water to flow downwardly out of the outlet port 12.

By means of the above construction, embodiments of the invention have the advantageous features in comparison to the prior art:

(I) When the faucet is turned off, the switch rod 20 and the valve body 30 can fall downwardly due to their weight together with the restoring force of the flexible piece 35. With this arrangement, the pressure of water remained in the faucet or the connecting pipe 15 is not too high, and thus the water will not suddenly spray out of a shower nozzle when the faucet is turned on next time. (II) The water can flow out of an outlet port 12 of the faucet in a normal state. Thus, the water will not suddenly sprays out of the shower nozzle when the faucet is turned on next time, thereby preventing the user from getting shocked by the sudden spraying of water or getting scalded by spraying of hot water. Therefore, embodiments of the invention have an improved safety in use. (III) The water can flow out of the outlet port 12 of the faucet in a normal manner. Thus, the user does not need to exert a force to push back the switch rod 20, which provides convenience in use. (IV) The flexible piece 35 and the bending sections 36 are integrally formed atop the valve body 30, which reduces production costs and simplifies the assembling process thereof. Thus, embodiments of the invention are more competitive in the industry.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A faucet control structure, including an outlet head, a switch rod and a valve body, wherein the interior of the outlet head is provided with a through-hole, an outlet end facing downwardly, and an inlet chamber, the outlet end and the inlet chamber are separated from each other by the through-hole, a switch rod hole is provided in the outlet head above the outlet end, the interior of the inlet chamber is provided around the through-hole with a connecting pipe extending rearward in the axial direction of the through-hole, one end of the switch rod is enlarged to form a pulling head, the other end is provided with a restricting groove, the end of the switch rod having the restricting groove penetrates into the switch rod hole via the outside of the outlet head to thereby combine the switch rod with the valve body in the outlet head, the valve body has a partitioning plate, a front surface of the partitioning plate is provided with two clamping claws for clamping the restricting groove after the valve body is disposed in outlet head via the outlet port, so that the valve body can be mounted into the outlet head and driven by the switch rod, characterized in that: an inverted U-shaped flexible piece is integrally formed atop the valve body, both sides of the flexible piece are provided with a bending section respectively, the bending sections not only provide a force for supporting the valve body when the valve body is compressed by an external force, but also provide a restoring force to the valve body after the external force is removed.

2. The faucet control structure according to claim 1, wherein a rear surface of the partitioning plate is provided with a protrusion having a chamber.

3. The faucet control structure according to claim 2, wherein the chamber is disposed therein with a leak-proof gasket.

* * * * *